United States Patent [19]

Milne

[11] 4,262,930
[45] Apr. 21, 1981

[54] TRUCK TRAILER SUSPENSION

[76] Inventor: Jonathan Milne, Oak Hill Rd., Barrington, N.H. 03825

[21] Appl. No.: 75,808

[22] Filed: Sep. 14, 1979

[51] Int. Cl.³ .......................................... B60G 11/04
[52] U.S. Cl. .................................................. 280/718
[58] Field of Search ............... 280/718, 121, 122, 694, 280/699; 267/2 S

[56] References Cited

U.S. PATENT DOCUMENTS

| | | | |
|---|---|---|---|
| 2,468,387 | 4/1949 | Wiley et al. | 280/718 |
| 3,897,844 | 8/1975 | Chevalier | 280/718 X |
| 3,964,735 | 6/1976 | Wright et al. | 280/697 X |
| 4,195,863 | 4/1980 | Richardson | 280/718 X |

Primary Examiner—John J. Love
Assistant Examiner—Norman L. Stack
Attorney, Agent, or Firm—Cesari and McKenna

[57] ABSTRACT

A trailer suspension of the type including a leaf spring pivotally connected at its opposite ends to the trailer frame and supported at its midpoint by the wheel axle has a special saddle assembly for securing the axle to the spring. The assembly includes the usual pair of U-bolts engaged around the spring and axle with the threaded ends of the U-bolts extending through openings in a saddle block so that nuts can be turned down onto those ends to clamp the spring, axle and saddle block together. Also a torque arm connects the saddle block to the frame forward of the axle. The saddle assembly differs from conventional ones, however, in that its saddle block includes an extension which extends an appreciable distance along the axle and the extension is provided with openings fore and aft of the axle for receiving a third U-bolt engaged around the axle. When nuts are turned down onto the threaded ends of the third U-bolt, the axle is connected directly to the saddle block and thus by way of the torque arm to the trailer frame. Consequently, if the spring should break between the pair of U-bolts (or become free of the frame), the third U-bolt, saddle block and torque arm maintain a direct connection between the axle and the trailer frame and prevent the axle from skewing relative to the trailer frame.

3 Claims, 3 Drawing Figures

TRUCK TRAILER SUSPENSION

This invention relates to a truck trailer suspension. It relates more particularly to an improved mode of securing a wheel axle to a truck trailer frame.

BACKGROUND OF THE INVENTION

The wheel axles of a truck trailer are invariably connected to the trailer bed or frame by way of a suspension which cushions the trailer against road impacts. The suspension for each end of the axle usually includes a relatively long multiple-leaf leaf spring whose opposite ends are pivotally connected via bushings to brakes secured at spaced apart locations along the length of a trailer side frame member. The wheel axle extends transversely between a pair of such leaf springs being connected near its opposite ends to those springs midway along their lengths.

As a general rule, the axle is connected to each spring by a saddle clamp assembly comprising a pair of U-bolts which engage over the midportion of the spring and extend down the sides of the spring and down along the sides of the axle through a pair of openings formed in the opposite sides of a cast metal saddle block which engages under the axle. The threaded ends of the bolts extend through the block and suitable nuts are turned down onto those bolt ends to draw the bolts toward the block and thereby clamp the axle to the spring. In a variant of the aforesaid construction, the U-bolts extend upwardly around the sides of the axle past the sides of the spring and are clamped to a saddle block engaged on the spring by nuts turned down onto the U-bolts.

Usually, also a torque arm is connected between the block and the frame bracket supporting the forward end of the spring to strengthen the suspension and prevent the axle and block from cocking relative to the center of the spring.

A problem arises with these conventional trailer suspensions, however. The various leaves in each leaf spring are normally connected together at their centers by a center bolt which extends through holes in the leaves. Consequently the spring as a whole is weakest at its center adjacent those holes. Because of age and rough usage, a leaf spring on a particular trailer may break at the central location adjacent the center bolt and between the two U-bolts where it suffers the most stress in use. When this occurs, the saddle block which is attached to the torque arm and trailer frame is allowed to swing free from the axle so that when the trailer brakes are applied, there is nothing holding the axle to the frame on the side of the trailer where the spring break occurs. Consequently, the axle is free to skew relative to the frame, which skewing may cause the saddle clamp assembly connecting the other end of the axle to its spring to snap. Resultantly, the entire axle and wheels may separate completely from the trailer causing a serious accident.

Also, if one of the suspension U-bolts should break, say the rear U-bolt on a rearmost suspension, and the trailer is backed up against an obstacle or over a relatively high bump, the impact against the wheel at that side of the trailer may cause that end of the axle to twist about its axis and break the remaining U-bolt holding that end of the axle to its spring giving rise to the same problem described above.

The potential for accident is especially serious if the wheels on a particular trailer are in tandem or pairs because if the forward wheel axle of a pair breaks away, the rearward axle in the pair may also be separated from the frame because of the forward axle and wheels smashing or being driven into it. Due to these various problems affecting prior truck trailer suspensions, a surprising number of road accidents occur every year, particularly when such trailer trucks are driven off-road or on secondary roads.

SUMMARY OF THE INVENTION

Accordingly, the present invention aims to provide an improved trailer suspension system.

Another object of the invention is to provide a suspension system which should materially reduce the incidence of wheel axle separation from the trailer frame or bed.

Still another object of the invention is to provide a suspension system which is relatively easy to install and retrofit on conventional trailer structures.

Yet another object of the invention is to provide an improved suspension system which should facilitate maintenance and repair of the trailer suspension components.

Other objects will, in part, be obvious and will, in part, appear hereinafter.

The invention accordingly comprises the features of construction, combination of elements, and arrangement of parts which will be exemplified in the following detailed description, and the scope of the invention will be indicated in the claims.

In general, a trailer suspension of the type including a leaf spring pivotally connected at its opposite ends to the trailer frame and supported at its midpoint by the wheel axle has a special saddle assembly for securing the axle to the spring. The assembly includes the usual pair of U-bolts engaged around the spring and axle with the threaded ends of the U-bolts extending through openings in a saddle block so that nuts can be turned down onto those ends to clamp the spring, axle and saddle block together. Also a torque arm connects the saddle block to the frame forward of the axle. The saddle assembly differs from conventional ones, however, in that its saddle block includes an extension which extends an appreciable distance along the axle and the extension is provided with openings fore and aft of the axle for receiving a third U-bolt engaged around the axle. When nuts are turned down onto the threaded ends of the third U-bolt, the axle is connected directly to the saddle block and thus by way of the torque arm to the trailer frame. Consequently, if the spring should break adjacent the center bolt or between the pair of U-bolts, the third U-bolt, saddle block and torque arm maintain a direct connection between the axle and the trailer frame preventing the axle from skewing relative to the trailer frame.

BRIEF DESCRIPTION OF THE DRAWING

For a fuller understanding of the nature and objects of the invention, reference should be had to the following detailed description, taken in connection with the accompanying drawing, in which.

DESCRIPTION OF THE PREFERRED EMBODIMENT

Figure 1:
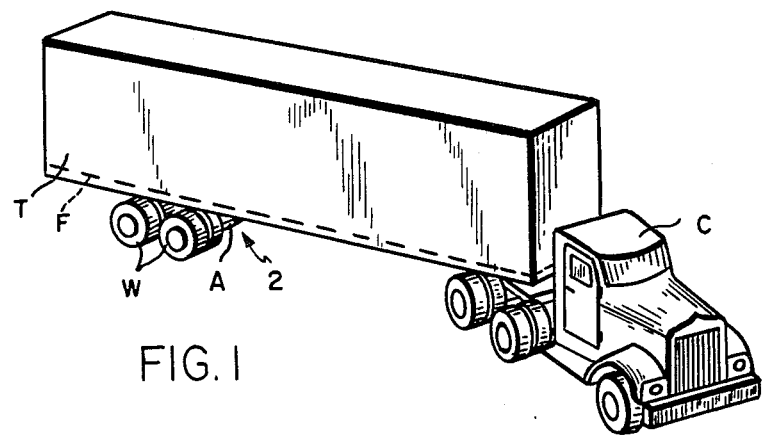
FIG. 1 is a perspective view of a truck trailer incorporating a suspension made in accordance with this invention.

Referring first to FIG. 1 of the drawing, a trailer T drawn by a cab C includes a horizontal bed or frame F which rides on wheels W supported by transverse axles A which are secured to frame F by my improved suspension, one of which is indicated generally at 2.

Figure 2:
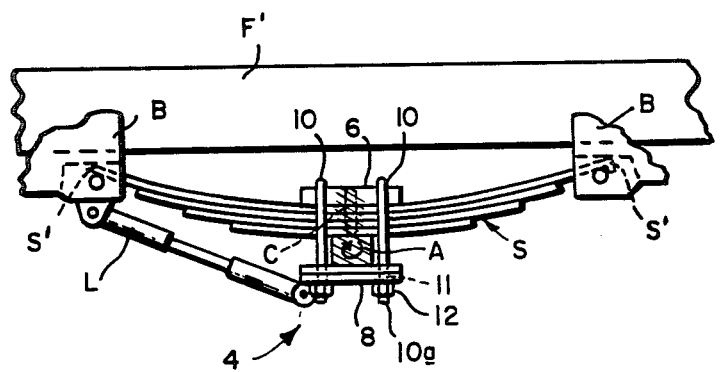
FIG. 2 is a fragmentary elevational view on a larger scale of a conventional trailer suspension.

Turning now for a moment to FIG. 2 which illustrates a conventional suspension of the type used on present day trailers to resiliently connect one end of a wheel axle A to the trailer frame F. The suspension includes an elongated multi-leaf leaf spring S. As usual, the spring leaves are connected together at their centers by a center bolt C. Spring S is pivotally connected at its opposite ends S' to a pair of brackets B secured at spaced-apart locations to a longitudinal frame member F' at one side of the trailer T. In the prior art suspension illustrated in FIG. 2, one end of the wheel axle A engages under the center of the spring S supporting it from below. In other conventional suspensions, the axle may be positioned above the center of the spring S. In either event, the axle is secured to the spring by a standard saddle clamp assembly shown generally at 4 in FIG. 2.

The conventional saddle clamp assembly includes an upper saddle block 6 positioned on the top of the spring S and a lower saddle block 8 engaged under the bottom of axle A. The two saddle blocks are somewhat wider than the spring so that they project beyond the sides of the spring. The two blocks 6 and 8 are clamped together with the spring and axle between them by a forward saddle bolt 10 which engages over the upper saddle block 6 with its legs extending down on opposite sides of the spring S just forward of axle A. The ends 10a of bolt 10 are threaded and extend through registering openings 11 in the lower saddle block 8 and suitable nuts 12 are turned down onto the two threaded ends of that U-bolt. A second identical U-bolt 10 extends over the upper and through openings 11 in lower saddle blocks just aft of the axle A. Thus when all of the nuts 12 are tightened, the center of the spring S and the axle A are gripped tightly together between the two saddle blocks 6 and 8. Usually, the conventional suspension also includes a torque arm or link L pivotally connected at its opposite ends via bushings (not shown) to the lower saddle block 8 and the bracket B supporting the forward end of spring S to give the suspension good stability and prevent the axle from rotating about its axis.

As clearly seen from FIG. 2, if the aft U-bolt 10 should break and the trailer is backed up so that the wheel supported by the axle A encounters an obstacle such as a bump or berm or the brakes are applied, the impact may impart a torque to axle A as shown by the arrow in FIG. 2 causing the axle to cock relative to spring S with the result that the forward U-bolt may also break so that that end of the axle separates completely from its spring S. The disengagement of one end of the axle in that manner permits the axle to skew causing the bolts at the opposite end of the axle to break so that the axle and wheels become completely separated from the trailer frame F. Of course, the same problem may arise if forward U-bolt 10 breaks and the aft two wheels are pulled forwardly over or onto an obstacle.

Also if the spring S should break, as it sometimes does, at its center segment indicated by the shading adjacent the center bolt C or between the two U-bolts 10, because of undue stress at that location, the broken ends of the spring separate from the saddle clamp assembly, again disconnecting that end of the axle A from the trailer frame F. Of course, if the trailer loses a set of wheels, it is not only disabled, it could cause a serious accident if the trailer is traveling at any appreciable speed at the time.

Figure 3:
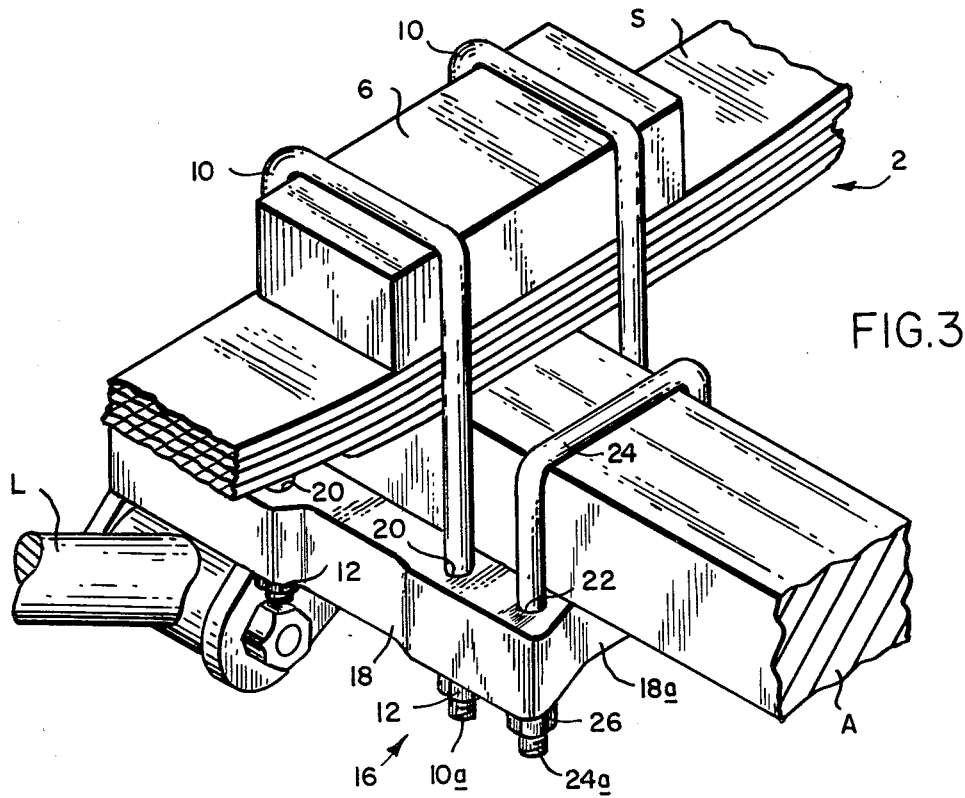
FIG. 3 is a fragmentary perspective view on a much larger scale of my new suspension.

In accordance with this invention, all of the aforesaid problems are substantially eliminated by modifying the saddle clamp assembly in each axle suspension. More particularly, and referring to FIG. 3, each end of the axle A is secured to the middle of its leaf spring S by a special saddle clamp assembly indicated generally at 16. Assembly 16 is somewhat similar to the conventional saddle clamp assembly 4 depicted in FIG. 2 in that it includes a standard upper saddle block 6 around which is engaged the usual pair of inverted U-bolts 10 whose legs extend down on opposite sides of the upper saddle block and spring S and down past the axle A terminating in threaded ends 10a. Assembly 16 also includes, however, a modified lower saddle block 18 which is engaged under the axle as shown in FIG. 4. Member 18 has an extension 18a which projects an appreciable distance laterally with respect to spring S and engages under an appreciable lengthwise segment of axle A usually outboard of the associated spring S. The lower saddle block 18 is formed with a pair of vertical openings 20 disposed on each side of axle A to accommodate the threaded ends 10a of the U-bolts 10. Those bolt ends project appreciably below the saddle block 18 and nuts 12 are turned down onto those ends to clamp the saddle blocks 6 and 18 together with the spring and axle between them. Also, the usual torque arm L is connected between block 18 and the forward bracket B on the trailer frame F as shown in FIG. 2.

In accordance with this invention, however, the lower saddle block extension 18a is provided with an additional pair of openings 22 situated fore and aft of axle A near the end of extension 18a. These openings 22 are arranged to receive the legs of a third U-bolt 24 which is engaged directly over axle A laterally of spring S. The U-bolt legs project through the openings 22 and their lower ends 24a are threaded to receive threaded nuts 26. When the nuts 26 are tightened, the axle A is clamped directly to the lower saddle block 18.

In the present arrangement then, the axle A is attached independently to the frame F by way of the U-bolt 24 and the lower saddle block 18 which is secured to the lower end of the torque arm L. Consequently, if the spring S should break between the two U-bolts 10, the lower saddle block 18 can still not swing free from the axle due to the clamping action of the third U-bolt 24. Consequently, when the trailer wheel brakes are applied, the bolt 24 and saddle block 18 still connect the axle A to the frame by way of the torque arm L. Likewise, if one of the U-bolts 10 should break and the trailer wheels should strike an obstacle of one kind or another, the extra U-bolt 24 and lower saddle block 18 prevent the axle A from turning about its axis and causing the remaining U-bolt 10 to break. Consequently, the chances of a wheel axle separating completely from the trailer frame F are quite remote.

An added advantage of the present suspension is that it makes it easier and safer to change springs S when that becomes necessary. When the nuts 12 are loosened or removed from U-clamps 10 and the spring S is slid out from under the U-bolts, the remaining U-bolt 24 clamped to axle A maintains the saddle blocks in alignment with the axle so that the new spring can be slid into place under the U-bolts and be reconnected to the spring supporting brackets B in a minimum amount of time and with a minimum amount of effort. The saddle assembly also makes it easier and safer to rebush the trailer since the saddle block 18 and torque arm L may be removed easily from the trailer and new bushings installed in the brackets B and saddle block 18 supporting the torque arm.

Thus, while the present saddle assembly seems at first glance to be quite similar to prior comparable arrangements of this general type, the change in the configuration of the lower saddle block 18 and the provision of the extra U-bolt 24 directly connecting the trailer axle to the frame by way of the lower saddle block and torque arm yields distinct advantages not found on present day suspensions in terms of increased safety and ease of trailer maintenance. Therefore, the suspension should be included on trailers of both the single and tandem variety. Indeed, because of its relative simplicity, the suspension can be retrofit on most present day trailers with a minimum amount of effort.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawing be interpreted as illustrative and not in a limiting sense.

It is also to be understood that the following claims are intended to cover all of the generic and specific features of the invention herein described.

What is claimed as new and desired to be secured by Letters Patent of the United States is:

1. In a trailer suspension of the type including an elongated leaf spring having its opposite ends pivotally connected to the trailer frame, a wheel axle disposed generally perpendicular to the spring, means for connecting the axle to the spring near the midpoint thereof in the form of a saddle clamp assembly including a pair of U-bolts engaged around the spring and axle, a saddle block formed with openings for receiving the threaded ends of the U-bolts and nuts turned down onto the U-bolt ends so as to clamp the spring, axle and block together, and a torque arm pivotally connected between the saddle block and the frame, the improvement wherein the axle is clamped to the underside of the spring, and the saddle block has an extension extending an appreciable distance along the length of the axle, means defining openings through the saddle block extension, said openings being positioned fore and aft of the axle, a third U-bolt having threaded ends engaged around the axle, the ends of the third U-bolt extending through the passages formed in the block extension, and a pair of nuts turned down onto the third U-bolt ends so as to clamp the axle to the top of the saddle block whereby a direct connection is established between the axle and the frame by way of the saddle block and torque arm which connection is independent of the spring.

2. The suspension defined in claim 1 wherein the saddle clamp assembly includes a second saddle block engaged by said pair of U-bolts, said second saddle block being positioned adjacent the bights of said pair of U-bolts.

3. The suspension defined in claim 1 wherein said saddle block extension and third U-bolt are positioned outboard on said axle from said spring.

* * * * *